(12) United States Patent
Zoheir et al.

(10) Patent No.: US 10,915,541 B2
(45) Date of Patent: Feb. 9, 2021

(54) GENERIC API

(71) Applicant: Verizon Patent and Licensing Inc., Arlington, VA (US)

(72) Inventors: Amr Zoheir, Piscataway, NJ (US); Mary P. Jelinek, Somerset, NJ (US); Divyesh S. Thakker, Lebanon, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 532 days.

(21) Appl. No.: 14/321,312

(22) Filed: Jul. 1, 2014

(65) Prior Publication Data

US 2016/0004754 A1  Jan. 7, 2016

(51) Int. Cl.
*G06F 16/24* (2019.01)
*G06F 16/248* (2019.01)
*G06F 16/2453* (2019.01)

(52) U.S. Cl.
CPC ...... *G06F 16/248* (2019.01); *G06F 16/24542* (2019.01)

(58) Field of Classification Search
CPC ......... G06F 17/30554; G06F 17/30463; G06F 17/30914; G06F 17/30
USPC .......................................................... 707/718
See application file for complete search history.

(56) References Cited

U.S. PATENT DOCUMENTS

| | | | | |
|---|---|---|---|---|
| 6,061,515 | A * | 5/2000 | Chang | G06F 17/30607 707/999.1 |
| 6,581,054 | B1 * | 6/2003 | Bogrett | G06F 17/30395 707/999.003 |
| 2004/0117377 | A1 * | 6/2004 | Moser | H04L 67/2823 707/999.01 |
| 2007/0219976 | A1 * | 9/2007 | Muralidhar | G06F 17/30017 707/999.004 |

* cited by examiner

*Primary Examiner* — Hosain T Alam
*Assistant Examiner* — Tracy M McGhee

(57) ABSTRACT

A system may include a user interface, a processor, and a memory having a program communicatively connected to the user interface. The program may include a data access layer and a data storage layer. The processor being configured to retrieve a data request having a record type and a data type from the user interface, retrieve an execution plan from the data access layer based on the record type, retrieve a map from the data access layer based on the data type, retrieve data from the data storage layer based on the execution plan and the map, and provide data to the user interface.

20 Claims, 7 Drawing Sheets

GENERIC API

BACKGROUND

An application programming interface (API) may be used to access data from a data center as well as ease the work of developers in programming graphical user interfaces. As part of the data center, data may be organized using a data model (e.g., using a table or map) to describe a data relationship, minimize data storage, and avoid or reduce duplication of data. This data may be difficult to access using business logic alone, because the business logic may require access to multiple maps and tables in a predefined sequence to get the data from various data centers for a specific business function.

Traditionally, an API is coded specifically to accomplish each business function. The API may include a library of API calls, which include native logic for retrieving data from fixed data locations. The API may allow a developer, using the native API calls, to specify one or more fixed access paths to respective data locations using a programming language determined by the type of data center, thereby requiring the developer to be familiar with the fixed access paths and programming language of each data center. It may be desirable to provide a generic API that is operationally separated from a business access layer and a data storage layer to utilize dynamic access paths and universal logic to retrieve data from one or more types of data centers.

DETAILED DESCRIPTION

A generic API system may be configured to access data, according to a data request, of one or more data centers having various data types and programming languages. The system may retrieve data according to a map having a record name of the data and a key defining a data location as part of a data center. It may be desirable to operatively separate a user interface (e.g., API), a data access layer (e.g., including logic for retrieving data according to business rules), and a data storage layer (e.g., including persistent storage of data). This separation of the logic and data storage from the user interface may reduce or avoid development of an API for each set of business rules and allow the data access layer to dynamically define the data locations. For example, the data access layer may utilize metadata logic (e.g., XML) that is independent of file type, instead of native API logic that defines fixed data locations according to a specific programming language of the data center. Thus, it may be desirable to utilize a generic API that allows the retrieval data of one or more data types and from one or more data centers having different programming languages.

Figure 1:
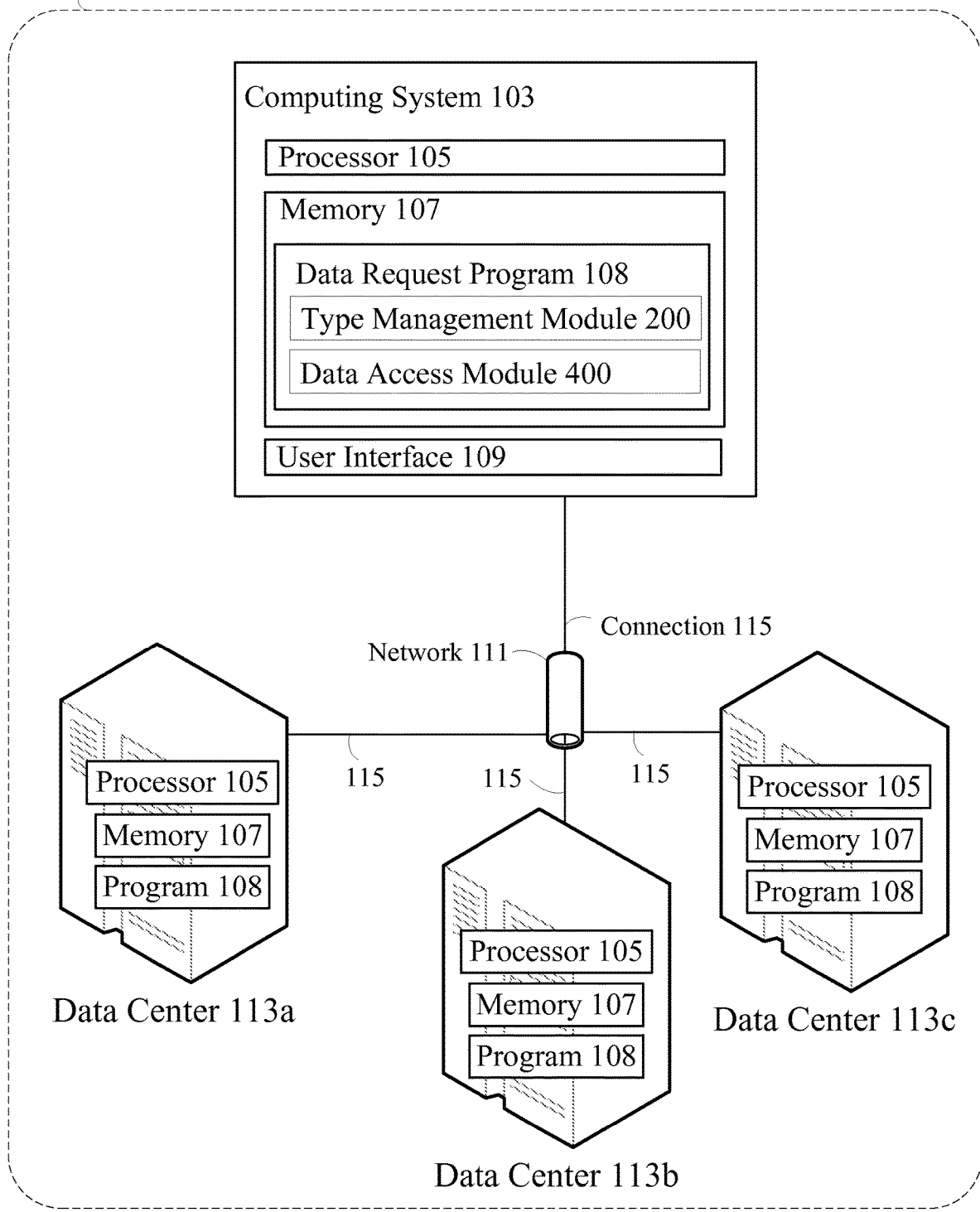
FIG. 1 illustrates an exemplary system of the present disclosure.

FIG. 1 illustrates an exemplary system 100 having a computing system 103, a network 111, one or more data centers 113, and a connection 115. Computing system 103 and data centers 113 may include a processor 105 and a memory 107 with a data request program 108 having a type management module 200 and a data access module 400. Computing system 103 may further include a user interface 109. Network 111 may connect computing system 103 with any number of data centers 113 (e.g., data centers 113a-c) using connections 115. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

In the exemplary system 100, computing system 103 may be communicatively connected to data centers 113a-c with network 111 using connections 115. Data centers 113a-c are representative of multiple computing systems working collectively to manage and store data. As described in further detail below, network 111 may provide the physical and logical connections to carry data along connections 115. The exemplary computing system 103 may be any computing system and/or device, which includes a processor and a memory (e.g., processor 105 and memory 107 described below), that enables the data request program 108 to acquire, process, and transfer data.

The exemplary system 100 and the exemplary computing system 103 may take many different forms and include multiple and/or alternate components and facilities. For instance, the computing system 103 may be separate from or actually integrated into any of data centers 113a-c. Further, in some examples, computing system 103 elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions, as described in further detail below.

The processor 105 may be any processor or microprocessor that receives instructions from a memory (e.g., memory 107 described below) and executes these instructions, thereby performing one or more processes, including one or more of the processes described herein. Such instructions and other data may be stored and transmitted using a variety of computer-readable media. The processor 105 may also include processes comprised from any hardware, software, or combination of hardware or software that carries out instructions of a computer programs by performing logical and arithmetical calculations, such as adding or subtracting two or more numbers, comparing numbers, or jumping to a different part of the instructions. The processor 105 may be any one of, but not limited to single, dual, triple, or quad core processors (on one single chip), graphics processing units, visual processing units, and virtual processors. In addition, a processor 105 is illustrated in each of the computing systems of FIG. 1 (e.g., computing system 103 and data centers 113a-c).

The memory 107 may be any computer-readable medium (also referred to as a processor-readable medium) that may include any non-transitory (e.g., tangible) medium that participates in providing data (e.g., instructions) that may be read by a computer (e.g., by a processor of a computer).

Such a medium may take many forms, including, but not limited to, non-volatile media and volatile media. Non-volatile media may include optical or magnetic disks and other persistent memory. Volatile media may include dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. In addition, a memory 107 is illustrated in each of the computing systems of FIG. 1 (e.g., computing system 103 and data centers 113a-c).

The data request program 108 may be software stored in the memory 107 of the computing system 103 and executed by the processor 105 of the computing system 103. When the data request program 108 is executed by the processor 105, the processor 105 is caused to perform one or more of the processes described herein. In operation, the data request program 108 may be configured to cause the processor 105 to connect via network 160 with and acquire data from at least one of data centers 113a-c.

The data request program 108 may include a type management module 200 and a data access module 400. The data request program 108 may cause the processor 105 to facilitate operations of and between type management module 200 and data access module 400. As described in more detail below, the data request program 108 may receive a data request from user interface 109, receive an execution plan and a map from type management module 200, retrieve data using data access module 400, and provide data to user interface 109.

The data request program 108 may be configured to facilitate communication between the modules of the data request program 108 (e.g., type management module 200 and data access module 400) and hardware/software components external to the data request program 108. For instance, the data request program 108 may be configured to communicate directly with other applications, modules, models, devices, systems, and other sources through both physical and virtual interfaces. The data request program 108 may include program code and specifications for routines, data structures, object classes, and variables that receive, package, present, and transfer data through a connection or over a network, as described below.

The data request program 108 may also be configured to generate and manage user interface 109, for example, to control and manipulate the data request program 108 based on a received input. That is, the data request program 108 may include program code configured to generate, present, and provide one or more user interfaces 109 (e.g., in a menu, icon, tabular, map, or datagrid format) in connection with other modules for presenting information (e.g., data, notifications, instructions, etc.) and receiving inputs (e.g., configuration adjustments).

The data request program 108 may also coordinate the management and storage of data, for example, using type management module 200 and data access module 400. Data request program 108 may identify at least one key, or a similar identifier, for each data center 113. Data request program 108 may utilize the key to manage the data between data centers 113. Thus, the computing system 103 along with data request program 108 may be used to move data between computing system 103 and data centers 113. The key may be one or more particular data fields chosen as identifiers from a database model. A database model may be a partition table listing the characteristics of each data field for the database scheme. The data fields are the containers that store information particular to a record. Thus, by choosing a particular set of data fields as a key, a database may arrange the records in partitions according to information in the particular set of data fields. Keys may generally be chosen from the data fields based on a data field's ability to uniquely identify a record.

The user interface 109 described herein may be provided as software that when executed by the processor 105 present and receive the information described herein. The user interfaces 109 may include HTTP, local, terminal, web-based, and mobile interfaces and any similar interface that presents and provides information relative to the data request program 108. The user interfaces 109 may also be provided as hardware or firmware, or combinations of software, hardware and/or firmware.

The user interface 109 may also include a display, support user interfaces, and/or any device configured to communicate data between a user and any portion of system 100. A display may include any input-output device for the receipt (e.g., to any portion of system 100) and presentation (e.g., from any portion of system 100) of information in visual or tactile form, such as user interfaces or web portals. Examples of display may include, without limitation, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, touch display, and the like. Thus, the display may present user interfaces or a web portal to a user, such that the user may interact with and receive information from other devices of system 100.

In general, databases, data repositories, or other data stores (e.g., data centers 113a-c), described herein may include various kinds of mechanisms for storing, providing, accessing, and retrieving various kinds of data, including a hierarchical database, a set of files in a file system, an application database in a proprietary format, a relational database management system (RDBMS), main memory database system (MMDB), etc. Each such data store may generally be included within a computing system (e.g., computing system 103) employing a computer operating system such as one of those mentioned above, and are accessed via a network or connection in any one or more of a variety of manners. A file system may be accessible from a computer operating system, and may include files stored in various formats. As mentioned above, data centers 113 may include a processor 105 and a memory 107 that work in combination to store, provide, access, and retrieve various kinds of data. Data centers 113 may also be provided as hardware or firmware, or combinations of software, hardware and/or firmware.

As mentioned above, the data centers 113 may be configured as an MMDB (a.k.a. "in-memory database"), which relies on main memory mechanism and generally employs internal optimization heuristics that execute fewer CPU instructions than RDBMS. One example of an MMDB may include eXtremeDB, which is a high performance, low-latency, ACID-compliant embedded database management system using an in-memory database system architecture and designed to be linked into C/C++ based programs. An example of an eXtremeDB may include IBM WebSphere eXtreme Scale, which implements a fully elastic memory based storage datagrid that virtualizes free memory of a large number of Java virtual machines and makes them behave like a single key addressable storage pool. For example, exemplary Map 1 below is an MMDB model listing the data fields for a particular MMDB scheme having a request type defined as "PrlLookupModel" with each row listing a record name or type (e.g., name or type of information to be retrieved) followed by a key including a string (e.g., alphanumeric string defining an access path with resnect to one or more data center 113).

Map 1:
PrlLookupModel orderNo : String
lnItmNo : String
prlRequestID : String
mdn : String
offrTypID : String
lnItmTypCd : String
lnItmCreateDt : long
lnFullfillReqDt : long
billSysID : String
offrTypCD : String The network 111 may be a collection of computers and other hardware to provide infrastructure to establish virtual connections and carry communications. That is, the network 111 may be configured to provide an infrastructure that generally includes edge, distribution, and core devices and provides a path for the exchange of information between different devices and systems. The network 111 may be any conventional networking technology, and may, in general, be any packet network (e.g., any of a cellular network, global area network, wireless local area networks, wide area networks, local area networks, or combinations thereof, but may not be limited thereto) that provides the protocol infrastructure to carry communications between the computing system 103 and data centers 113a-c via connections 115.

The connections 115 may be wired or wireless connections (e.g., transmission media including coaxial cables, copper wire, fiber optics, and the like) between two endpoints (devices, systems, or networks) that carry electrical signals that facilitate virtual connections. Virtual connections are comprised of the protocol infrastructure that enables communication to and from the data request program 108 and data centers 113. Although the network 111 and connections 115 of FIG. 1 illustrate the computing system 103 and the data centers as directly connected, other combinations of hardware and software may be used to connect these devices. Thus, any portion of system 100 may be located within a single data center or in separate locations such that the computing system 103 may be located in a self-contained, sub-network of any data center 113, which may be connected to the other data centers 113 via network 111 (e.g., as a backbone network).

In general, computing systems and/or devices, such as computing system 103, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing systems and/or devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, Procedural Language (PL), Structured Query Language (SQL), Non-Structured Query Language (NoSQL or Non-SQL), etc. For example, SQL is a special-purpose programming language designed for managing data, for example, held in a relational database management system (RDBMS). Alternatively, non-SQL provides a mechanism for storage and retrieval of data that is modeled in means other than the tabular relations used in relational databases, for example using a map (e.g., hash table or hash map) to retrieve data values according a key that defines a data location (e.g., associated with a data center). Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
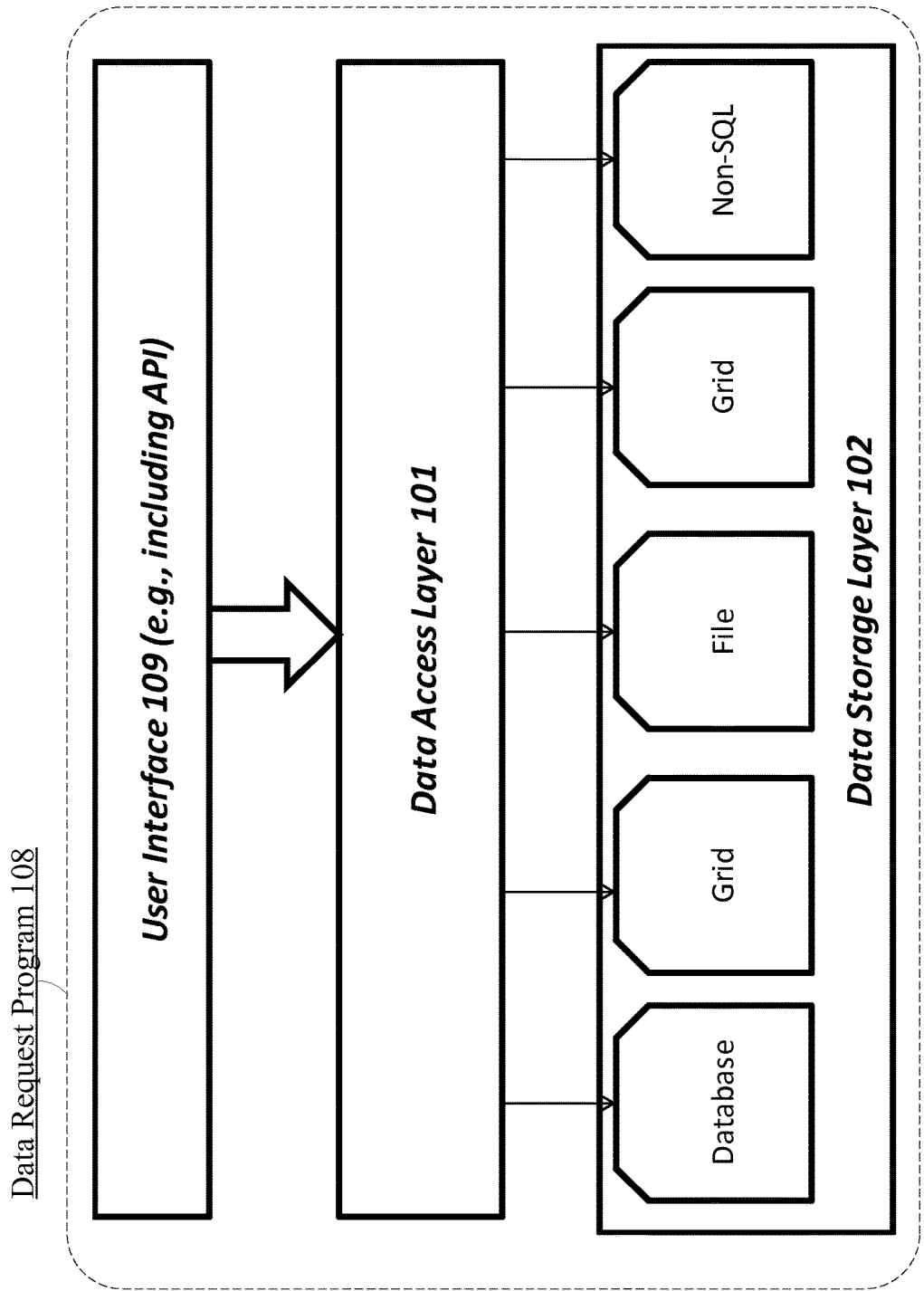
FIG. 2 illustrates an exemplary data request program of the system, for example, in communication with a user interface, a data access layer, and a data storage layer.

FIG. 2 illustrates an exemplary data request program 108 of system 100 for processing data requests. The data request program 108 may communicatively connect a user interface 109, a data access layer 101, and a data storage layer 102. The data request program 108 may take many different forms and include multiple and/or alternate components and facilities. While an exemplary data request program 108 is shown in FIG. 2, the exemplary components illustrated in FIG. 2 are not intended to be limiting. Indeed, additional or alternative components and/or implementations may be used.

Referring to FIG. 2, a data request program 108 may operationally separate a user interface 109, a data access layer 101, and a data storage layer 102. User interface 109 may receive a data request by a user of interface 109. The user interface 109 may send the data request to a data access layer 101. Data access layer 101 may include logic for processing the data request (e.g., having an SQL/XML metadata format). Data access layer 101 may retrieve data from data storage layer 102, which may include one or more types of data centers (e.g., database, grid, file, table, and non-SQL). Below is exemplary Data Request 1 (e.g., in an SQL/XML metadata format) that may be specified to user interface 109 by a developer, for example, to fetch and return data (e.g., in an XML format).

Data Request 1:

```
<?xml version="1.0" encoding="UTF-8"?>
<scm:mcselements xmlns:scm="http://www.vzw.com/namespaces/scm"
xmlns:xsi="http://www.w3.org/2001/XMLSchema-instance"
xsi:schemaLocation="http://www.vzw.com/namespaces/scm
mcsdataservices.xsd">
    <scm:request>
        <scm:transId>134</scm:transId>
        <scm:getter>
            <scm:type>PrlLookupModel</scm:type>
            <scm:seqNo>1</scm:seqNo>
            <sem:criteria>
                <scm:expr>
                    <scm:operator>EQ</scm:operator>
                    <sem:attribute>OrderNo</scm:attribute>
                    <scm:value>5052634898</scm:value>
                </scm:expr>
            </scm:criteria>
        </scm:getter>
    </scm:request>
</scm:mcselements>
```

As shown above, the data request, received by user interface 109, specifies the data to be retrieved, for example, without defining the logic or data access paths as part of user interface 109. An exemplary request may include a transaction ID (e.g., "scm:transID" specifies number and letters associated with a particular transaction), a function (e.g., specifies a function such as "scm:getter" to get data form a data center), a type (e.g., "scm:type" specifies a data type such as "PrlLookupModel" of Table 1 above), an operator (e.g., "scm:operator" specifies a comparison or logical operator defined by data access layer 101), a data value (e.g., "scm:value" defines a value applied by the logical operator), and an attribute (e.g., "scm:attribute" specifies a record name associated with the value). As explained in more detail below, user interface 109 receives the request specifying the data, but the data access layer 101 defines the logic for retrieving the data and data storage layer 102 retrieves the data from one or more data stores 113.

Exemplary operators may include comparison operators and logical operators that define the criteria for the data to be retrieved. Comparison operators may include EQ (e.g., returns data that has a data field equal to a value) as shown above, IN (e.g., if an element is a member of a specified group), NOT_EQ (e.g., if an element is not equal to a value), GT (e.g., if a data field greater than), GR_OR_EQ (e.g., if first data field is greater or equal to a second data field), LT (e.g., less than), LT_OR_EQ (e.g., less than or equal to), LIKE (e.g., starts with, ends with, or contains), and ISNULL (e.g., checks if a data field is empty). Logical operators may include OR (e.g., provides an output if any conditions are satisfied), AND (e.g., provides an output if all conditions are satisfied, and NOT (e.g., provides an output if the condition is not satisfied). In addition, operators may have one or more levels of dependency on other operators.

Figure 3:
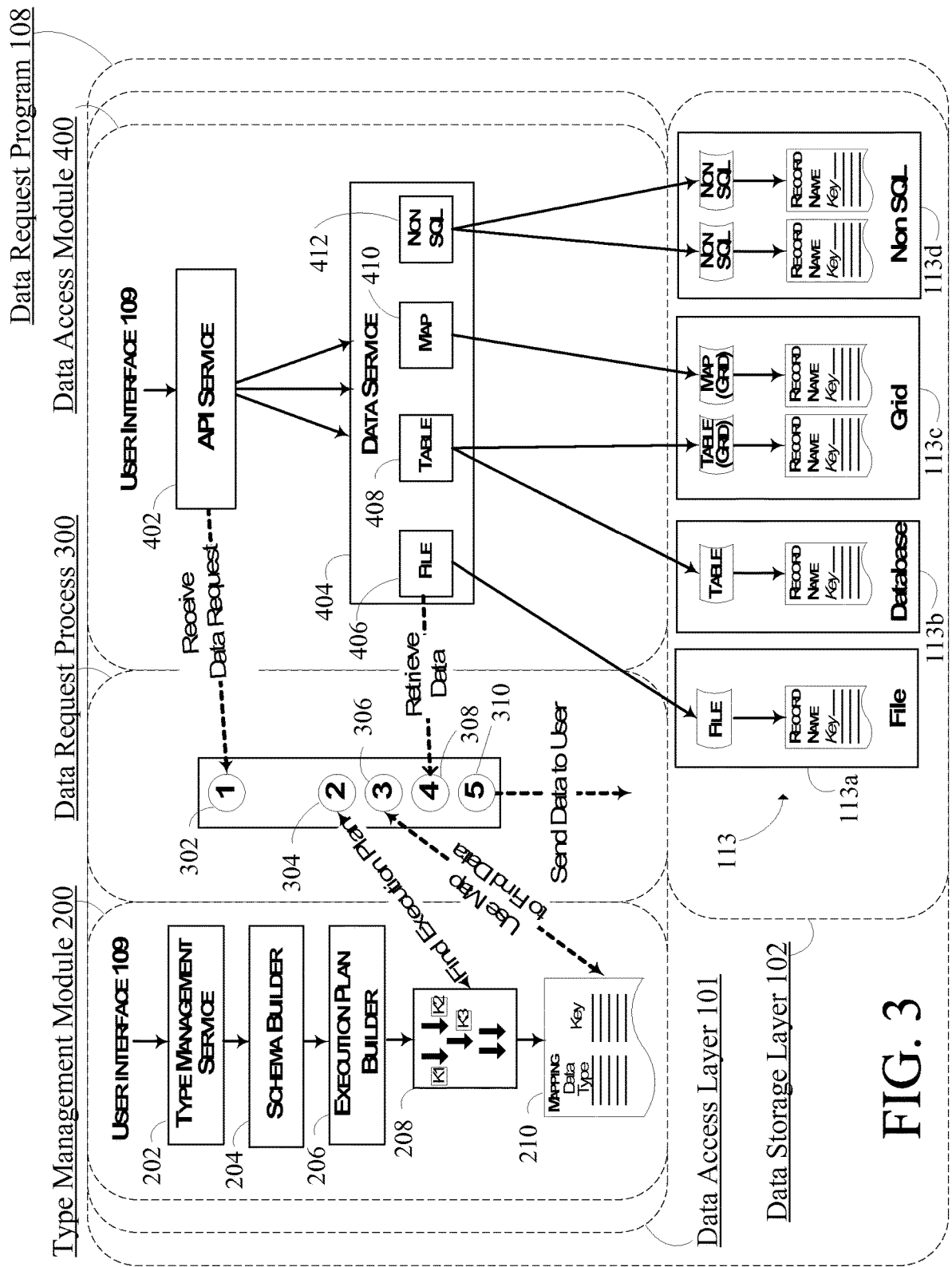
FIG. 3 illustrates further details of the exemplary data request program, for example, including a type management module, a data request process, and a data access module.

FIG. 3 illustrates exemplary operations of a data request program 108, for example, to process a data request. Exemplary data request program 108 may take many different forms and include multiple and/or alternate components and facilities. While an exemplary data request program 108 is shown in FIG. 3, the exemplary components illustrated in FIG. 3 are not intended to be limiting. Indeed, additional or alternative components and/or implementations may be used.

As shown in FIG. 3, exemplary data request program 108 includes a data access layer 101 and a data storage layer 102. Data access layer 101 may include a type management module 200, a data request process 300, and a data access module 400. Data request process 300 may include the interactions between the type management module 200 and the data access module 400, for example, to retrieve data in accordance with a data request having a request type (e.g., customer record, person or invoice ID). As described in further detail below, the data request process 300 may include receive data request 302, find execution plan 304, find data 306, retrieve data 308, and send data 310.

The data request process 300 may communicatively connect type management module 300 and data access module 400. Data request process 300 may receive a request from a user of data access module 400, for example, to acquire, retrieve, or receive data from amongst the data centers 113 through the network 111 via connections 115. Data request process 300 may receive an execution plan and a map from type management module 200 and retrieve data using data access module 400 from data centers 113 according to the map. Data request process 300 may send the retrieved data to user interface 109.

The type management module 200 may include a type management service 202, a schema builder 204, an execution plan builder 206, an execution plan retriever 208, and a mapping 210. The type management service 202 may be configured to allow a user (e.g., with user interface 109) to manage type definitions as part of data request program 108. The type definitions (also referred to as "typedefs") include a set of declarations in a markup language (e.g., XML) for each request type. The type definitions include elements and attributes associated with the request type. The type management service 202 may be configured to add, update, and delete type definitions associated with particular request types and data types.

The schema builder 204 is configured to create one or more schemas according to each request type. In addition to the constraints imposed by a markup language, the schema includes constraints for each request type. These constraints are generally expressed using some combination of grammatical rules governing the order of elements, Boolean predicates that a data field must satisfy (e.g., if a data field satisfies a condition, then true or false), data types governing the content of elements and attributes, and other specialized rules. The schema builder 204 may be configured to create, update, and delete schemas associated particular request types and data types.

The execution plan builder 206 is configured to create one or more execution plans according to each request type, which may require data of one or more data types. An execution plan is an ordered set of execution steps used to access data. The execution plan retriever 208 is configured to retrieve an execution plan according to the request type. Mapping 210 is configured to generate a map matching a data type and a data location for each data type (e.g., with respect to one or more data centers 113). The execution plan builder 206 may be configured to create, update, and delete execution plans associated with particular request types and data types. Furthermore, the execution plan builder 206 may be configured to analyze the type definitions, verify that keys of the map point to data (e.g., also referred to as getter criteria), and set criteria for keys, data types, data filters (e.g., data to be excluded), and functions (e.g., logic to be performed) that are to be associated with each type definition.

The data access module 400 may include API service 402 and data service 404. Data service 440 may include file retriever 406, table retriever 408, map retriever 410, and non-SQL retriever 412. Data service 440 may be configured to assign portions of a data request according to data type (e.g., file, table, map, non-SQL, etc.). For example, file retriever 406 may be configured to retrieve file type data from one or more data centers 113a, table retriever 408 may be configured to retrieve table type data from one or more data centers 113b-c, map retriever 410 may be configured to retrieve map data from one or more data centers 113c, and non-SQL retriever may be configured to retrieve non-SQL data from one or more data centers 113d.

In operation, the data request program 108 executes a data request using the type management module 200 and the data access module 400. A data request is received by API service 402 (e.g., using user interface 109). The data request may be received without a fixed data location of a specific data center 113 associated with the data to be retrieved. Instead of using the fixed data location, execution plan retriever 208 provides an execution plan, for example, using a request type (e.g., customer record, person or invoice ID) to find an execution plan according to the request type. Each execution plan that is coded to fetch data according to the request type, for example, without requiring the data location. Then mapping 210 provides a map, to be used by the execution plan, that matches data types with data locations on one or more data centers 113. The data service 404 activates the execution plan that searches for the data center 113 and returns the data to the user (e.g., of user interface 109) according to the data request.

Figure 4A:
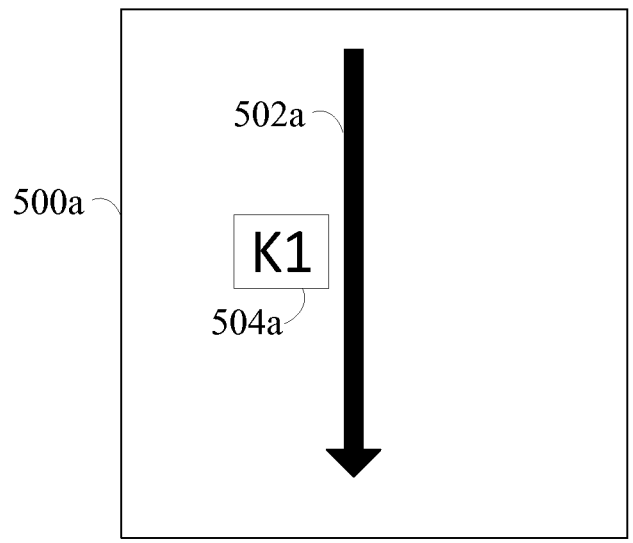
FIGS. 4a-c illustrate exemplary execution plans of the system.
Figure 4B:
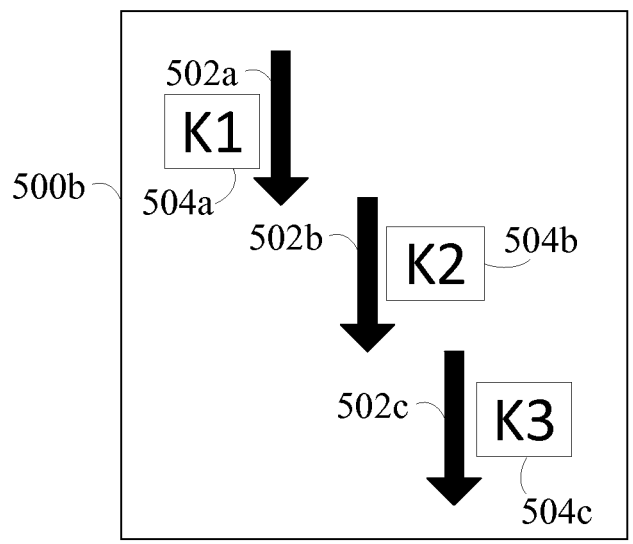
Figure 4C:
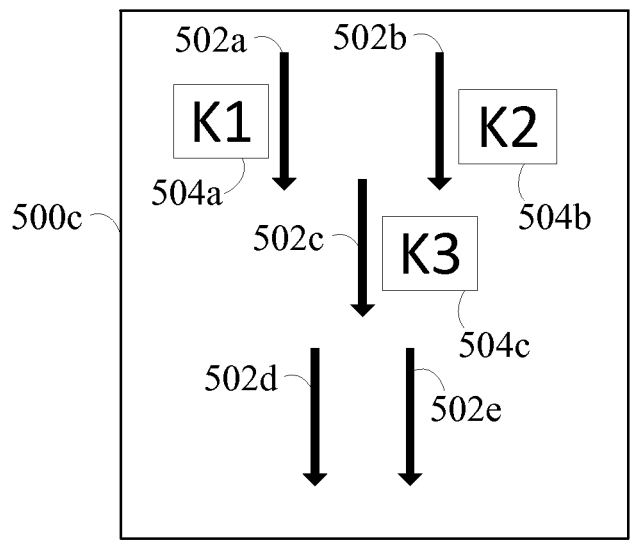

FIGS. 4a-c illustrate operations of exemplary execution plans 500, for example, to process a data request. Exemplary execution plans 500 may take many different forms and include multiple and/or alternate components and facilities. While exemplary execution plans 500 are shown in FIGS. 4a-c, the exemplary components illustrated in FIGS. 4a-c are not intended to be limiting. Indeed, additional or alternative components and/or implementations may be used.

As shown in FIGS. 4a-c, the execution plans 500 may have one or more execution steps 502 that each point to a particular map having a record name and a key, as discussed above. FIG. 4a shows a simple execution plan 500a having one data type and one data location that may be retrieved with an execution step 502a having a key 504a (e.g., associated with a particular data center 113). FIG. 4b illustrates a more complex execution plan 500b having execution step 502a, an execution step 502b (e.g., dependent on execution step 502a) having a key 504b (e.g., associated with one or more of the same or different data centers 113), and an execution step 502c (e.g., dependent on execution steps 502a and 502b) having a key 504c (e.g., associated with one or more of the same or different data centers 113). Even more complex, FIG. 4c illustrates an execution plan 500c having execution steps 502a and 502b that may be processed in parallel, execution plan 502c (e.g., dependent on execution steps 502a and 502b), and execution steps 502d and 502e that may be processed in parallel (e.g., depending on execution steps 502a-c).

Figure 5:
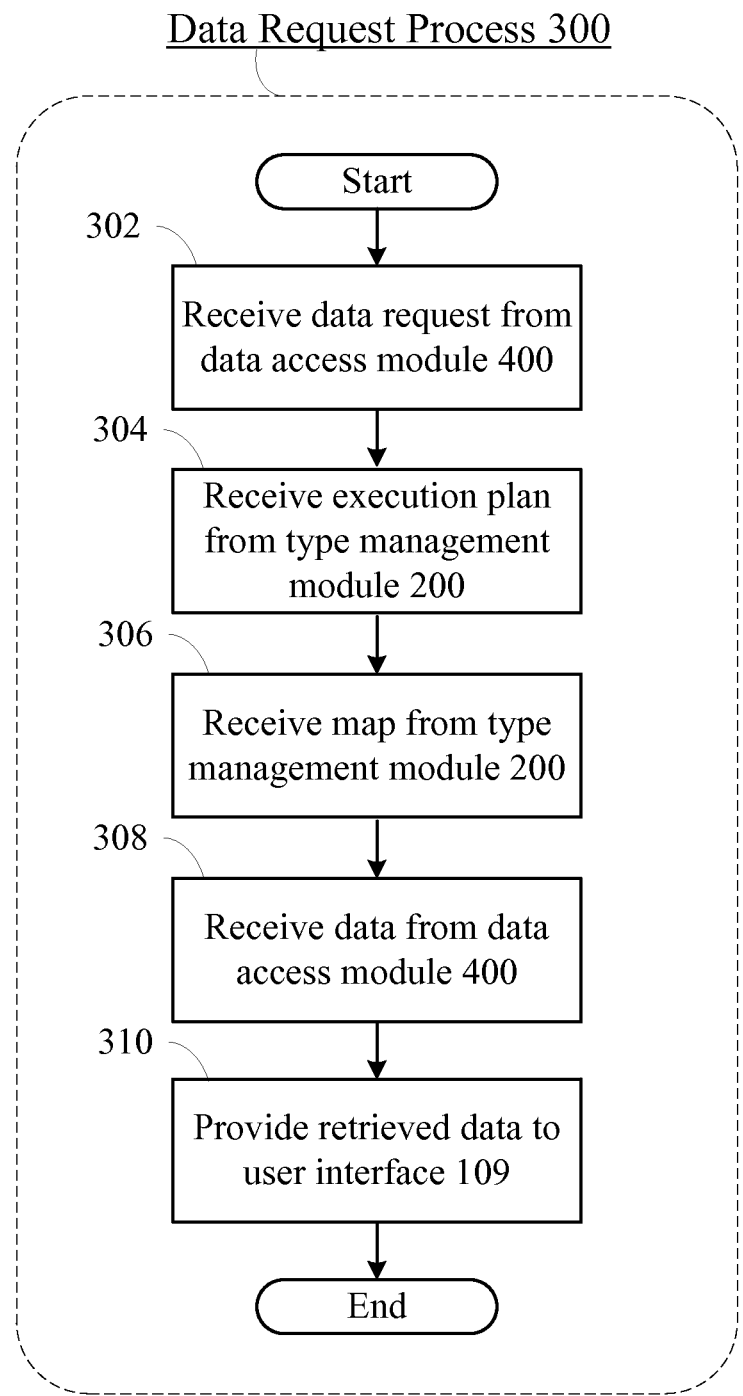
FIG. 5 illustrates an exemplary data request process of the system, for example, to process data requests.

FIG. 5 illustrates an exemplary type management process 300, for example, to be executed by the data request program 108. Exemplary process 300 may take many different forms and include multiple and/or alternate steps. While an exemplary process 300 is shown in FIG. 5, the exemplary steps illustrated in FIG. 5 are not intended to be limiting. Indeed, additional or alternative steps and/or implementations may be used.

At block 302, a data request may be received from API service 402 of data access module 400, e.g., using user interface 109.

At block 304, an execution plan may be received from execution plan retriever 208 of type management module 200, as discussed above.

At block 306, a map may be retrieved from mapping 210 of type management module 200, as discussed above.

At block 308, data may be retrieved from data service 202 of data access module 400, as discussed above.

At block 310, retrieved data may be provided to user interface 109.

After block 310, process 300 ends.

Figure 6:
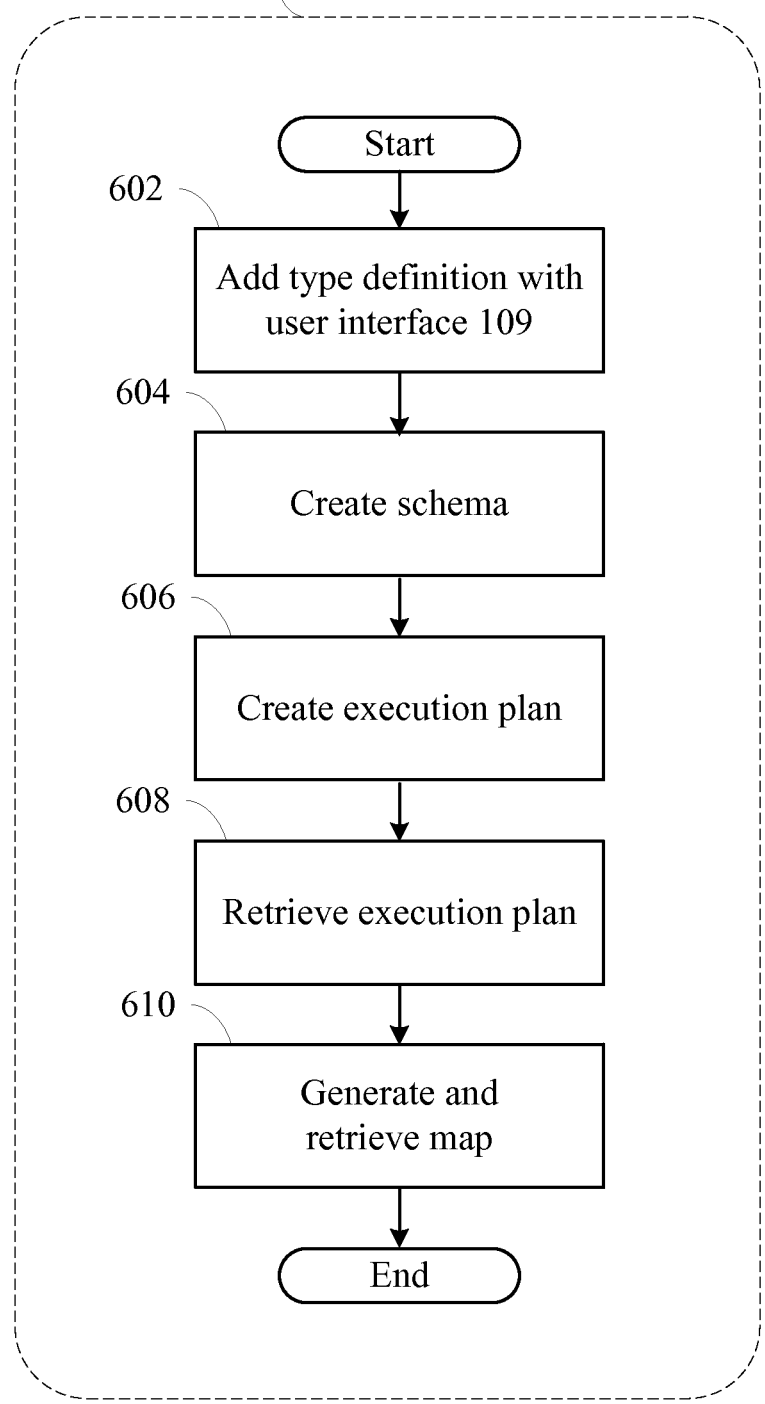
FIG. 6 illustrates an exemplary type management process of the type management module.

FIG. 6 illustrates an exemplary type management process 600, for example, to be executed by the type management module 200 of data request program 108. Exemplary process 600 may take many different forms and include multiple and/or alternate steps. While an exemplary process 600 is shown in FIG. 6, the exemplary steps illustrated in FIG. 6 are not intended to be limiting. Indeed, additional or alternative steps and/or implementations may be used.

At block 602, a user (e.g., of user interface 109) may add a type definition to type management service 202, as described above.

At block 604, a schema may be created by the schema builder 204, as discussed above.

At block 606, an execution plan may be created the execution plan builder 206, as discussed above.

At block 608, the execution plan may be retrieved by the type management module 200 and provided to data request process 300.

At block 610, a map may be generated and retrieved by the type management module 200, as discussed above.

After block 610, process 600 ends.

Figure 7:
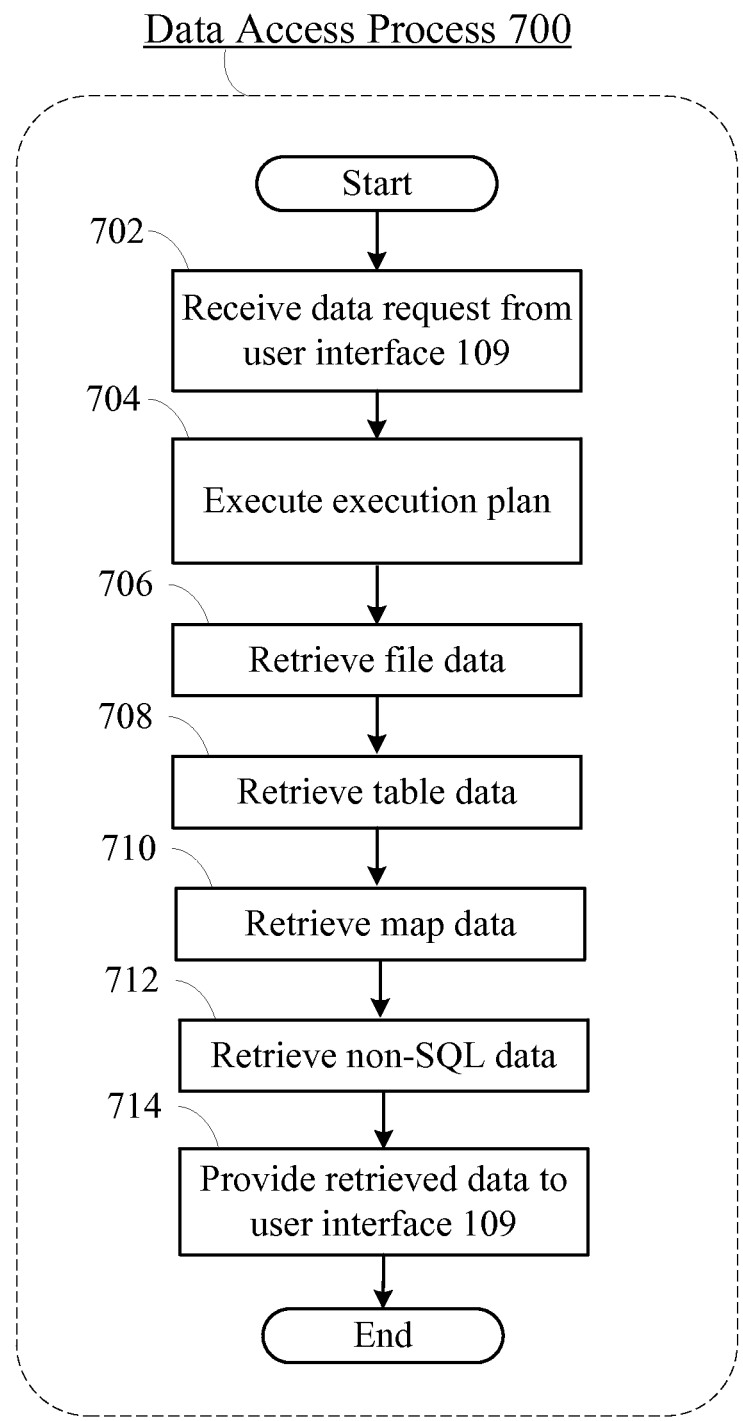
FIG. 7 illustrates an exemplary data access process of the data access module.

FIG. 7 illustrates an exemplary data access process 700, for example, to be executed by the data access module 400 of data request program 108. Exemplary process 700 may take many different forms and include multiple and/or alternate steps. While an exemplary process 700 is shown in FIG. 7, the exemplary steps illustrated in FIG. 7 are not intended to be limiting. Indeed, additional or alternative steps and/or implementations may be used.

At block 702, a data request is received by API service 402 of data access module 400 from user interface 109 (e.g., an API).

At block 704, the data service 404, e.g., using processor 105, retrieves an execution plan from the type management module 200. As discussed above, the execution plan retriever 208 of type management module 200 is configured to retrieve, e.g., using processor 105, an execution plan according to a request type of the data request. Mapping 210 is configured to generate, e.g., using processor 105, a map matching a data type and a data location for each data type with respect to one or more data centers 113. The execution plan is executed by the data service 404 of the data access module 400, e.g., using processor 105, as discussed above.

At block 706, the data service 404, e.g., using processor 105, retrieves file data from data center 113a (e.g., a file type data store).

At block 708, the data service 404, e.g., using processor 105, retrieves table data from data center 113b (e.g., a database) and data center 113c (e.g., a grid).

At block 710, the data service 404, e.g., using processor 105, retrieves map data from data centers 113c (e.g., a grid).

At block 712, the data service 404, e.g., using processor 105, retrieves non-SQL data from data centers 113d (e.g., non-SQL type data store).

At block 714, the data service 404, e.g., using processor 105, provides the retrieved data to user interface 109.

After block 714, process 700 ends.

Alternatively, the data service 404 may be configured to send requests to user API service 402, type management module 200, and data centers 113. For example, the data service 404 may further be configured to request an execution plan from type management module 200. The data request service 202 may also be configured to send a request to receive file data, table data, map data, and non-SQL data from respective data centers 113a-d. In addition, the data service 404 may be configured to send a request to send the retrieved data to user API service 402.

Accordingly, the system 100 may be configured to provide a generic API that is operationally separated from a business access layer and a data storage layer to utilize dynamic access paths and universal logic to retrieve data from one or more types of data centers. The system may not require the API to be coded specifically to accomplish each business function. The API may not require fixed data locations to retrieve data. The API may allow a developer, without requiring native API calls, to specify one or more dynamic access paths to respective data locations using a universal programming language. Thus, a developer may utilize the generic API without detailed knowledge of the fixed access paths and programming language of each data center.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing system, comprising:
   a user interface associated with an Application Programming Interface (API);
   a processor; and
   a memory having a program with a type management module for managing type definitions of a plurality of data types for at least two types of data centers, the memory being communicatively connected to the processor, the program having a data access layer and a data storage layer that are operationally separated from the API to retrieve data from the at least two types of data centers by the data access layer using universal logic and dynamic access paths including a comparison defined by the data access layer without fixed data locations,
   wherein the processor, when executing the program, is configured to:
   receive, by way of the user interface in communication with the type management module using the universal logic and at least one of the dynamic access paths, a data request having a record type and a data type of the plurality of data types according to the managed type definitions, transmit a request for an execution plan from the data access layer based on the record type,
transmit a request for a map from the data access layer based on the data type, wherein the map on the data access layer defines a data location for the data type of the at least two types of data centers,
receive the execution plan and the map,
update, by way of the user interface in communication with the type management module, at least one of the managed type definitions for transmitting a request for data from the data storage layer based on the execution plan and the map, and thereby activating the execution plan that uses the map to search at least one of the at least two data centers according to the data request, and
provide the data to the user interface.

2. The system of claim 1, further comprising a data access module, wherein the type management module and the data access module are part of the data access layer.

3. The system of claim 1, wherein the type management module is configured to add, by way of the user interface, a type definition to the managed type definitions, and
wherein the processor is further configured to retrieve the data by the dynamic access paths using the comparison, each of the at least two types of data centers having a different programming language.

4. The system of claim 1, wherein the type management module includes a schema builder configured to generate a schema associated with the record type.

5. The system of claim 1, wherein the type management module includes an execution plan builder configured to generate the execution plan associated with the record type and including ordered execution steps for each the plurality of data types according to the managed type definitions.

6. The system of claim 2, wherein the data access module includes a data service configured to retrieve data from a plurality of data centers according data type.

7. The system of claim 6, wherein the plurality of data centers includes at least a first data center having file type data, a second data center having table type data, a third data center having a grid type data, and a non-SQL type data center.

8. A non-transitory computer-readable medium tangibly embodying computer-executable instructions of a data request program with a type management module for managing type definitions of a plurality of data types for at least two types of data centers, the data request program having a data access layer and a data storage layer that are operationally separated from an Application Programming Interface (API) to retrieve data from the at least two types of data centers by the data access layer using universal logic and dynamic access paths including a comparison defined by the data access layer without fixed data locations, the data request program being executable by a processor of a computing device to provide operations comprising:
receive, by way of the a interface in communication with the type management module using the universal logic and at least one of the dynamic access paths, a data request having a record type and a data type;
transmit a request for an execution plan from the data access layer based on the record type;
transmit a request for a map from the data access layer based on the data type, wherein the map on the data access layer defines a data location for the data type of the at least two types of data centers;
receive the execution plan and the map;
update, by way of the user interface in communication with the type management module, at least one of the managed type definitions to transmit a request for data from the data storage layer based on the execution plan and the map; and
provide the data to the user interface.

9. The medium of claim 8, further comprising a data access module, wherein the type management module and the data access module are part of the data access layer.

10. The medium of claim 8, wherein the type management module is configured to add, by way of the user interface, a type definition to the managed type definitions, and
wherein the operations further comprise retrieving the data by the dynamic access paths using the comparison, each of the at least two types of data centers having a different programming language.

11. The medium of claim 8, wherein the type management module includes a schema builder configured to generate a schema associated with the record type.

12. The medium of claim 8, wherein the type management module includes an execution plan builder configured to generate the execution plan associated with the record type and including ordered execution steps for each the plurality of data types according to the managed type definitions.

13. The medium of claim 9, wherein the data access module includes a data service configured to retrieve data from a plurality of data centers according data type.

14. The medium of claim 13, wherein the plurality of data centers includes at least a first data center having file type data, a second data center having table type data, a third data center having a grid type data, and a non-SQL type data center.

15. A method comprising:
providing a data request program with a type management module for managing type definitions of a plurality of data types for at least two types of data centers, the data request program having a data access layer and a data storage layer that are operationally separated from an Application Programming Interface (API);
retrieving data from the at least two types of data centers using dynamic access paths including a comparison defined by the data access layer without fixed data locations;
receiving, by way of the user interface in communication with the type management module using the universal logic and at least one of the dynamic access paths, a data request having a record type and a data type;
transmitting a request for an execution plan from the data access layer based on the record type;
transmitting a request for a map from the data access layer based on the data type, wherein the map on the data access layer defines a data location for the data type of the at least two types of data centers;
receiving the execution plan and the map;
updating, by way of the user interface in communication with the type management module, at least one of the managed type definitions for transmitting a request for data from the data storage layer based on the execution plan and the map; and
providing the data to the user interface.

16. The method of claim 15, further comprising a data access module, wherein the type management module and the data access module are part of the data access layer.

17. The method of claim 15, wherein the type management module is configured to add, by way of the user interface, a type definition to the managed type definitions, and further comprising:

retrieving the data by the dynamic access paths using the comparison, each of the at least two types of data centers having a different programming language.

18. The method of claim 15, wherein the type management module includes a schema builder configured to generate a schema associated with the record type.

19. The method of claim 15, wherein the type management module includes an execution plan builder configured to generate the execution plan associated with the record type and including ordered execution steps for each the plurality of data types according to the managed type definitions.

20. The method of claim 16, wherein the data access module includes a data service configured to retrieve data from a plurality of data centers according to data type.

* * * * *